US011458923B2

(12) United States Patent
Harm et al.

(10) Patent No.: US 11,458,923 B2
(45) Date of Patent: Oct. 4, 2022

(54) VEHICLE AIRBAG SYSTEM

(71) Applicant: HYUNDAI MOBIS CO., LTD., Seoul (KR)

(72) Inventors: Jae Jun Harm, Yongin-si (KR); Sang Won Hwangbo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/319,413

(22) Filed: May 13, 2021

(65) Prior Publication Data

US 2021/0354650 A1 Nov. 18, 2021

(30) Foreign Application Priority Data

May 14, 2020 (KR) .................. 10-2020-0057604

(51) Int. Cl.
*B60R 21/207* (2006.01)
*B60R 21/2338* (2011.01)
*B60R 21/261* (2011.01)
*B60R 21/231* (2011.01)
*B60R 21/00* (2006.01)

(52) U.S. Cl.
CPC ........ *B60R 21/207* (2013.01); *B60R 21/2338* (2013.01); *B60R 21/23138* (2013.01); *B60R 21/261* (2013.01); *B60R 2021/0048* (2013.01); *B60R 2021/0058* (2013.01); *B60R 2021/23146* (2013.01); *B60R 2021/23386* (2013.01)

(58) Field of Classification Search
CPC ............ B60R 21/207; B60R 21/23138; B60R 21/2338; B60R 2021/0058; B60R 2021/23146; B60R 2021/23386
See application file for complete search history.

(56) References Cited

U.S. PATENT DOCUMENTS

| 5,330,255 | A | * | 7/1994 | Stawicki | B60N 2/914 |
| | | | | | 297/391 |
| 6,158,812 | A | * | 12/2000 | Bonke | B60N 2/818 |
| | | | | | 297/216.12 |
| 7,150,468 | B2 | * | 12/2006 | Pan | B60R 21/207 |
| | | | | | 280/730.1 |
| 9,132,798 | B2 | * | 9/2015 | Yasuoka | B60R 21/231 |
| 9,688,233 | B2 | * | 6/2017 | Lee | B60R 21/217 |
| 10,112,570 | B2 | * | 10/2018 | Barbat | B60N 2/90 |
| 10,189,431 | B2 | * | 1/2019 | Yamamoto | B60R 21/237 |
| 10,315,606 | B2 | * | 6/2019 | Ohno | B60R 21/207 |
| 10,336,278 | B2 | * | 7/2019 | Schneider | B60R 21/18 |
| 10,336,284 | B2 | * | 7/2019 | Dry | B60R 21/23138 |

(Continued)

FOREIGN PATENT DOCUMENTS

KR 10-10633890000 B1 9/2011

*Primary Examiner* — James A English
*Assistant Examiner* — Joselynn Y Sliteris
(74) *Attorney, Agent, or Firm* — NovoTechIP International PLLC

(57) ABSTRACT

Provided is an airbag system for a vehicle including an airbag cushion that is mounted on an upper end of a seatback and deployed forward to be located on both sides of the head of an occupant so as to limit upward movement of the occupant by restraining an upper body of the occupant in the event of a vehicle collision; an inflator that supplies gas to the airbag cushion in the event of the vehicle collision; and an external tether that has one end fixed to the airbag cushion and the other end fixed to the seatback.

10 Claims, 7 Drawing Sheets

(56) References Cited

U.S. PATENT DOCUMENTS

| | | | |
|---|---|---|---|
| 10,471,920 B2* | 11/2019 | Dry | B60R 21/2165 |
| 10,518,733 B2* | 12/2019 | Dry | B60R 21/01554 |
| 10,525,858 B2* | 1/2020 | Hickman Guevara | ............... |
| | | | B60N 3/106 |
| 10,556,563 B2* | 2/2020 | Song | B60R 21/2338 |
| 10,556,564 B2* | 2/2020 | Lee | B60R 21/231 |
| 10,596,993 B2* | 3/2020 | Dry | B60R 21/232 |
| 10,625,704 B2* | 4/2020 | Dry | B60N 2/14 |
| 10,632,958 B2* | 4/2020 | Dry | B60R 21/2338 |
| 10,850,699 B2* | 12/2020 | Dry | B60R 21/207 |
| 2014/0327234 A1* | 11/2014 | Heurlin | B60N 2/2884 |
| | | | 280/730.1 |
| 2015/0197170 A1* | 7/2015 | Obukhov | B60R 21/207 |
| | | | 297/391 |
| 2018/0162315 A1* | 6/2018 | Lee | B60R 21/2346 |
| 2019/0016293 A1* | 1/2019 | Saso | B60R 21/264 |
| 2019/0248322 A1* | 8/2019 | Herzenstiel | B60R 21/207 |
| 2020/0317154 A1* | 10/2020 | Choi | B60R 21/013 |
| 2021/0061211 A1* | 3/2021 | Jung | B60R 21/26 |

* cited by examiner

VEHICLE AIRBAG SYSTEM

CROSS-REFERENCE TO RELATED APPLICATION

This application claims the benefit under 35 U.S.C. § 119(a) of Korean Patent Application No. 10-2020-0057604 filed on May 14, 2020 in the Korean Intellectual Property Office, the entire disclosure of which is incorporated herein by reference for all purposes.

BACKGROUND

Field

Exemplary embodiments of the present disclosure relate to an airbag system for a vehicle, and more particularly, to an airbag system for a vehicle, which stably protects an occupant by limiting the upward movement of the occupant.

Discussion of the Background

In general, a headrest is a kind of safety device for protecting an occupant together with a seat belt in the event of a rear collision. The height of the headrest is adjusted according to the height of a driver or an occupant and the headrest serves to restrain the driver or occupant's neck from bending back in the event of a rear collision.

Furthermore, an airbag system for a vehicle is a device capable of reducing injuries caused by an impact by instantaneously inflating an airbag in the event of a vehicle collision.

Since the existing rear collision evaluation is mainly low speed evaluation, it is possible to restrain an occupant through a headrest and a seat belt. However, as autonomous driving is gradually expanded and a rotatable seat increases, the possibility of injuries is increasing as in rear collisions according to the rotation of a seat even in the event of a front collision.

However, there is a problem that it is difficult to restrain the behavior of an occupant only by the existing headrest or airbag system in mid-speed or high-speed rear collision situations. Therefore, there is a limit to stably protecting the occupant from an impact.

The background art of the present disclosure is disclosed in Korean Patent No. 10-1063389 (registered on Sep. 1, 2011 and entitled "Airbag Apparatus for a Vehicle").

SUMMARY

Various embodiments are directed to providing an airbag system for a vehicle, which is mounted on an upper portion of a seatback and can restrain an upper body of an occupant during deployment.

Furthermore, various embodiments are directed to providing an airbag system for a vehicle, which stably protects an occupant by limiting the upward movement of the occupant even in the event of a mid-speed or high-speed rear collision.

An airbag system for a vehicle in accordance with the present disclosure may include: an airbag cushion that is mounted on an upper portion of a seatback and deployed forward to be located on both sides of the head of an occupant so as to limit upward movement of the occupant by restraining an upper body of the occupant in the event of a vehicle collision; an inflator that supplies gas to the airbag cushion in the event of the vehicle collision; and an external tether that has one end fixed to the airbag cushion and the other end fixed to the seatback.

The external tether may provide a pulling force so that the airbag cushion is pulled downward when the airbag cushion is deployed, thereby restraining the upward movement of the occupant in the event of the vehicle collision.

The airbag cushion may include: a pair of side cushion parts that is provided to be deployed forward from the upper portion of the seatback and located on both sides of the occupant and provided to press the shoulders of the occupant downward by the external tether; and a connection cushion part that connects the pair of side cushion parts.

The connection cushion part may be fixed to a mounting part formed on a rear surface of an upper portion of a seatback frame provided in the seatback.

The external tether may be provided outside the airbag cushion, and the pair of external tethers may be provided to correspond to the pair of side cushion parts.

One end of the external tether may be fixed to a front end of the side cushion part, and the other end of the external tether may be fixed to a position spaced apart from the upper portion of the seatback in a downward direction.

The inflator may be inserted and assembled into the connection cushion part and the gas supplied from the inflator to the connection cushion part may be distributedly supplied to the pair of side cushion parts.

The airbag system for a vehicle may further include a diffuser assembled with the inflator and inserted into the connection cushion part, and distributes the gas supplied from the inflator to the pair of side cushion parts.

The diffuser may include: a pair of gas ejection regions that are provided to correspond to the pair of side cushion parts, and eject the gas supplied from the inflator to inner spaces of the side cushion parts; and a sewing line that is formed in a partial region of an edge of the diffuser so that the gas ejection regions are formed.

The airbag cushion may have a cross-section formed in a C shape to surround the neck of the occupant.

The present disclosure includes the airbag cushion that is mounted on the upper portion of the seatback and restrains the upper body of an occupant during deployment and the external tether that supports the airbag cushion, which makes it possible to stably protect the occupant by limiting the upward movement of the occupant even in the event of a mid-speed or high-speed rear collision.

DETAILED DESCRIPTION OF THE ILLUSTRATED EMBODIMENTS

Hereinafter, embodiments of the present disclosure will be described in detail with reference to the accompanying drawings.

First, embodiments to be described below are embodiments suitable for understanding the technical characteristics of an airbag system for a vehicle in accordance with the present disclosure. However, the present disclosure is not limitedly applied to the embodiments to be described below or the technical characteristics of the present disclosure are limited by the embodiments to be described below, and various modifications can be made within the technical range of the present disclosure.

Figure 1:
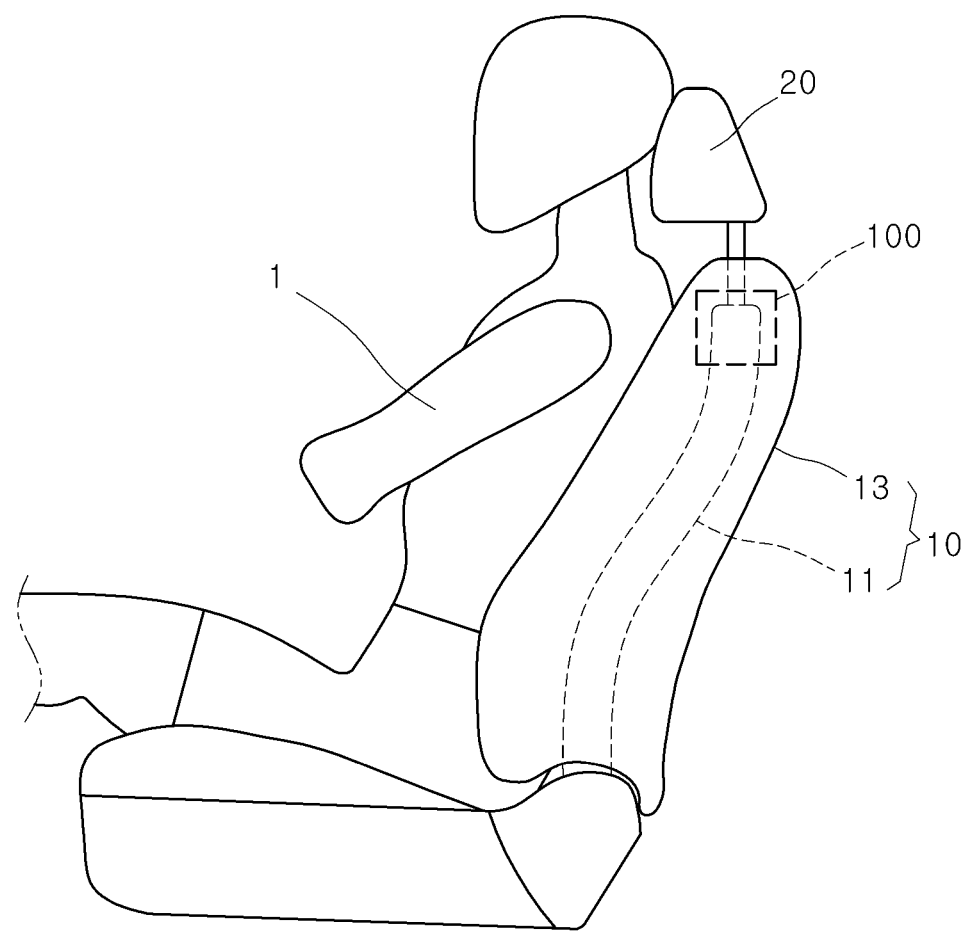
FIG. 1 is a side view illustrating a state in which an airbag system for a vehicle in accordance with an embodiment of the present disclosure is installed in a seatback.
Figure 2:
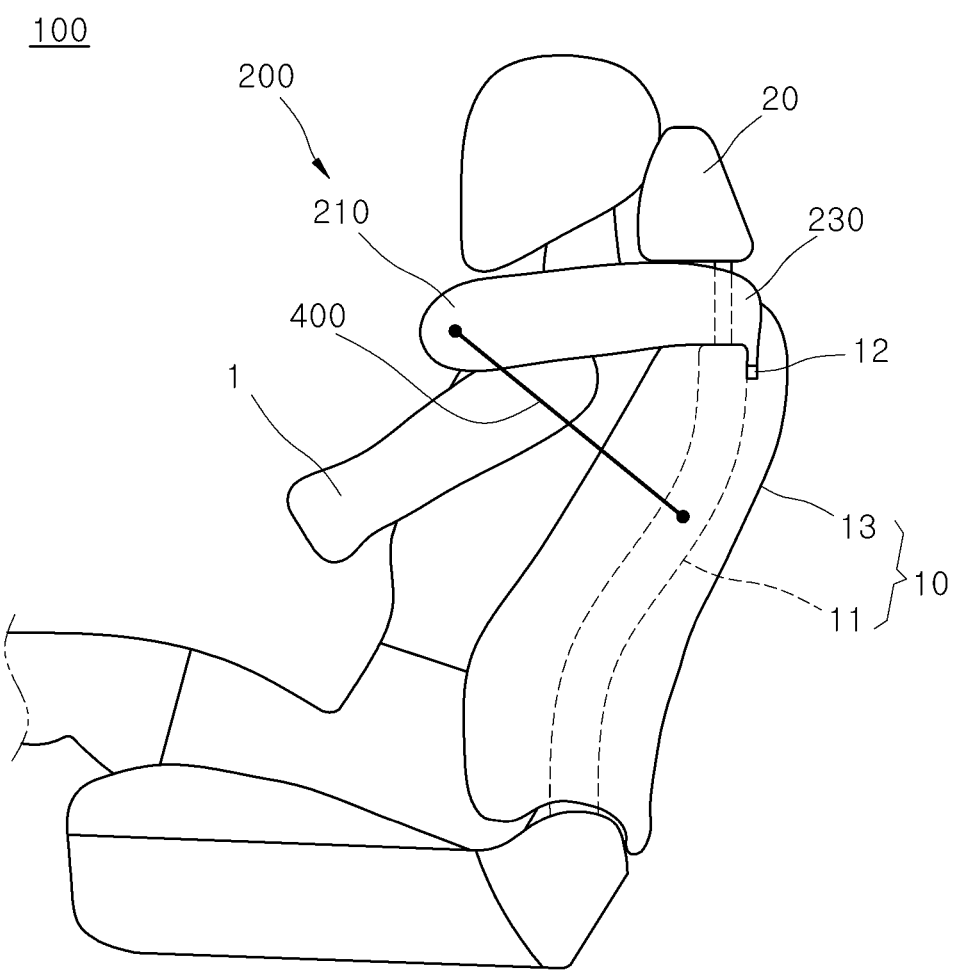
FIG. 2 is a side view illustrating a deployed state of the airbag system for a vehicle in accordance with an embodiment of the present disclosure.

FIG. 1 is a side view illustrating a state in which an airbag system 100 for a vehicle in accordance with an embodiment of the present disclosure is installed in a seatback 10, and FIG. 2 is a side view illustrating a deployed state of the airbag system 100 for a vehicle in accordance with an embodiment of the present disclosure.

Figure 3:
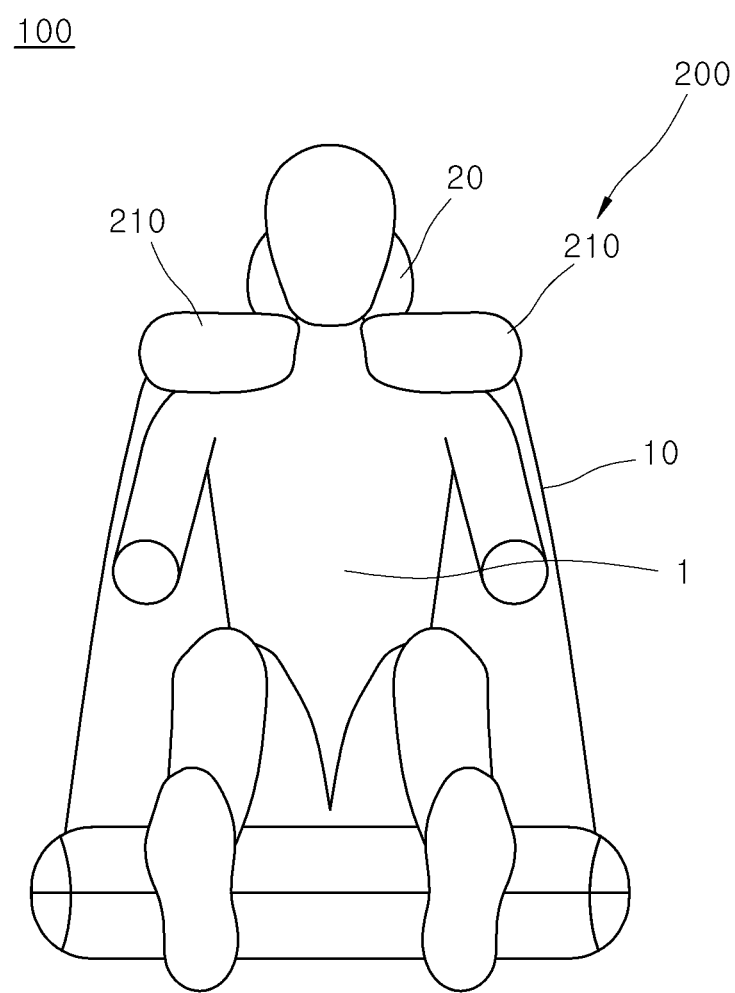
FIG. 3 is a front view illustrating a deployed state of the airbag system for a vehicle in accordance with an embodiment of the present disclosure.
Figure 4:
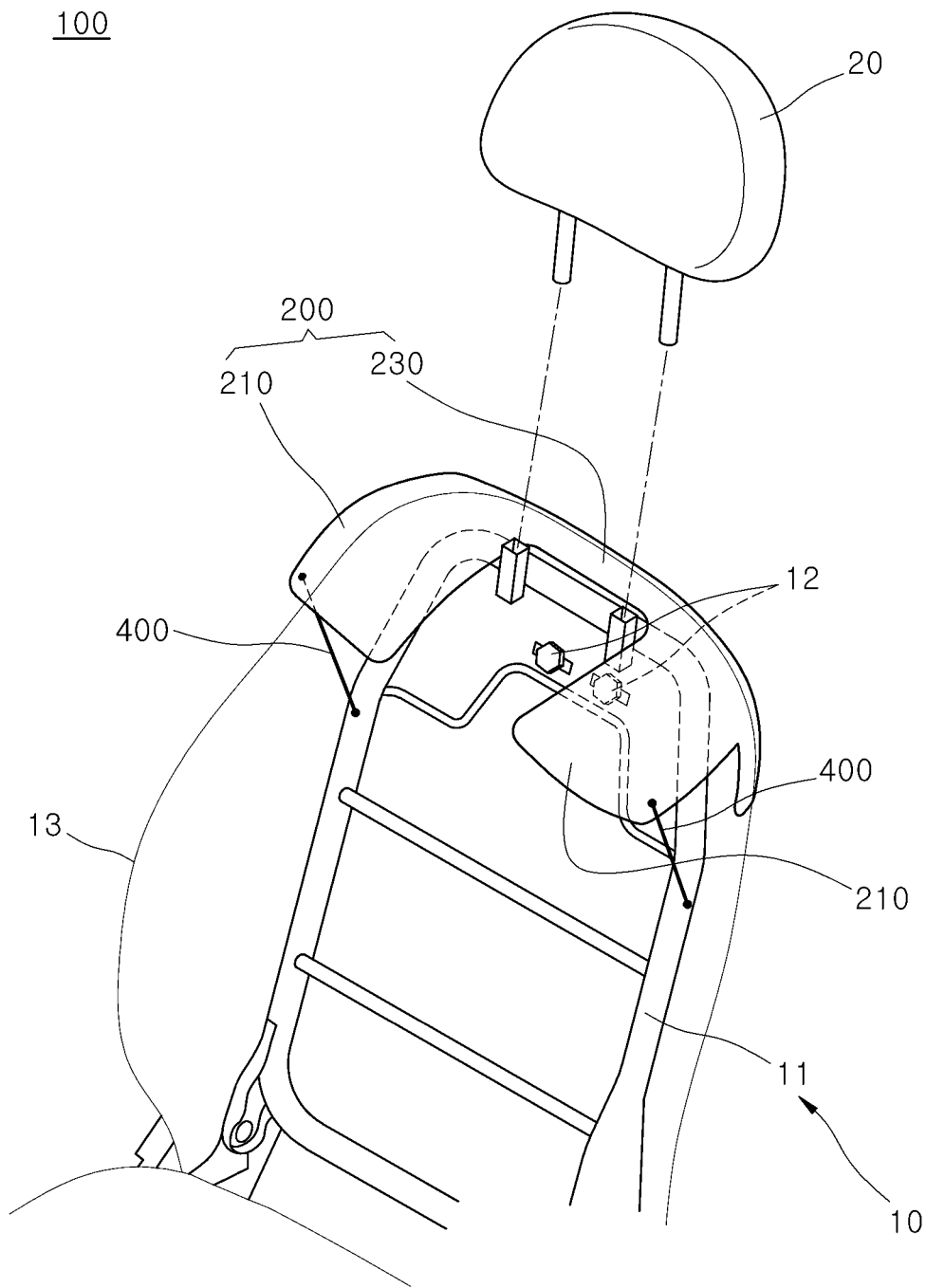
FIG. 4 is a perspective view illustrating a coupled state of the airbag system for a vehicle in accordance with an embodiment of the present disclosure and a seatback frame.
Figure 5:
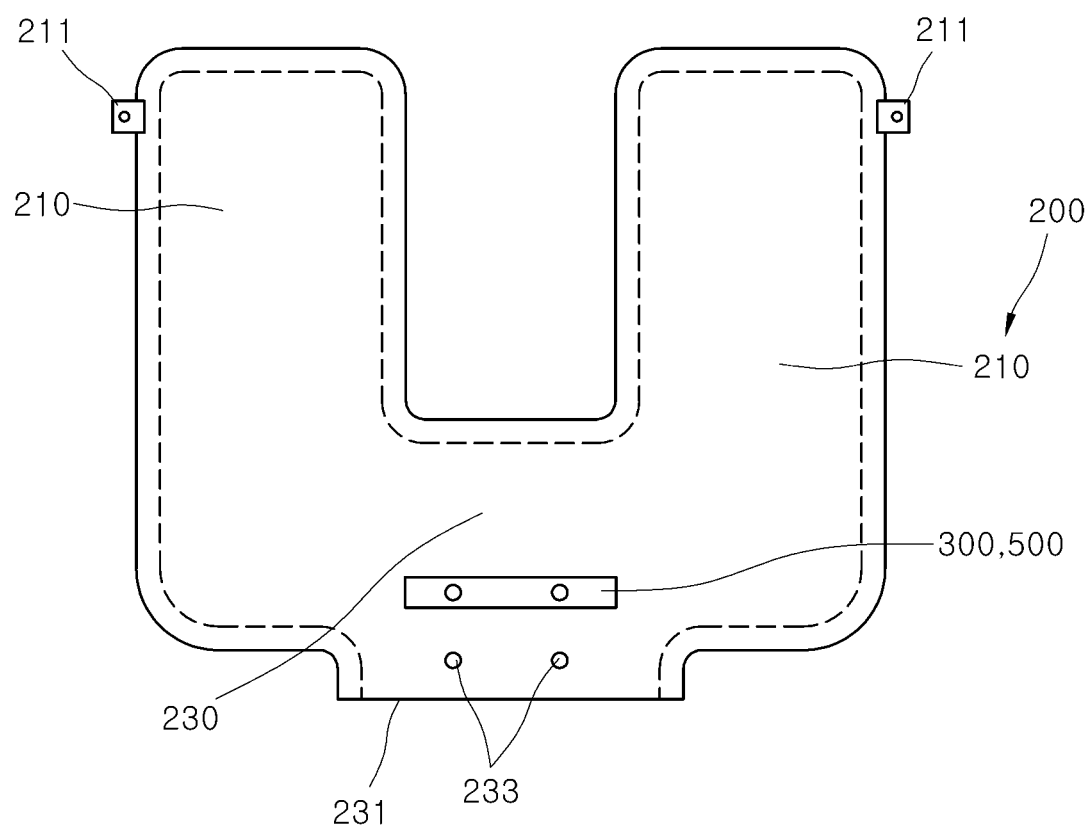
FIG. 5 is a deployment view illustrating the airbag system for a vehicle in accordance with an embodiment of the present disclosure.
Figure 6:
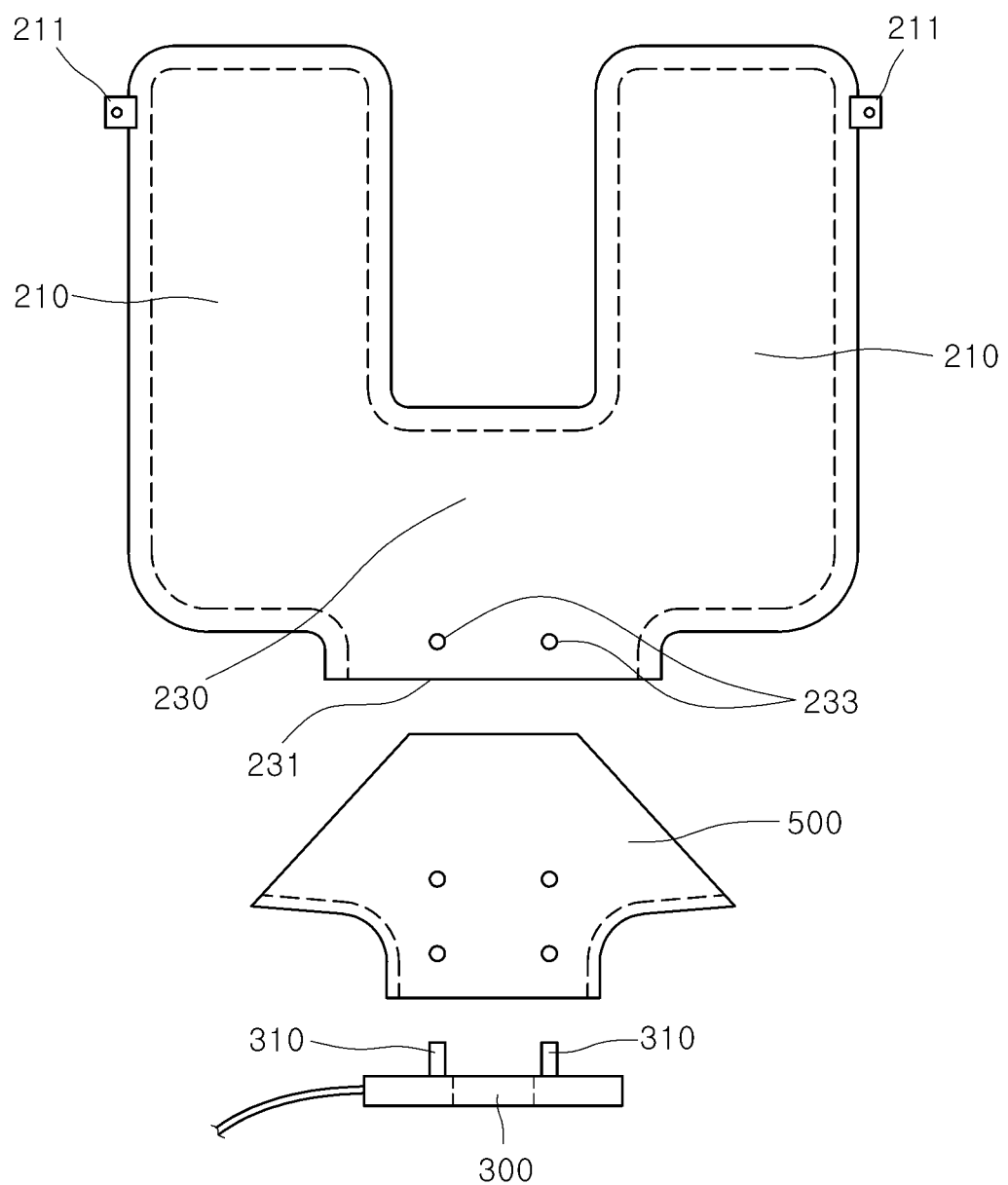
FIG. 6 is an exploded deployment view illustrating the airbag system for a vehicle illustrated in FIG. 5.

FIG. 3 is a front view illustrating a deployed state of the airbag system 100 for a vehicle in accordance with an embodiment of the present disclosure, and FIG. 4 is a perspective view illustrating a coupled state of the airbag system 100 for a vehicle in accordance with an embodiment of the present disclosure and a seatback frame 11. FIG. 5 is a deployment view illustrating the deployment of the airbag system 100 for a vehicle in accordance with an embodiment of the present disclosure, and FIG. 6 is an exploded view illustrating the airbag system 100 for a vehicle illustrated in FIG. 5.

Hereinafter, the direction in which an occupant 1 is seated on the basis of the seatback 10 is referred to as 'front' and the opposite direction of the front is referred to as 'rear'. Furthermore, terms indicating directions such as 'side', 'upward', and 'downward' are defined as indicating directions based on the aforementioned front and rear. For example, in a state in which a seat is rotated, a vehicle traveling direction may be the rear of the seatback 10 and an opposite direction of the vehicle traveling direction may be the front of the seatback 10.

Referring to FIG. 1 to FIG. 6, the airbag system 100 for a vehicle in accordance with an embodiment of the present disclosure includes an airbag cushion 200, an inflator 300, and an external tether 400.

The airbag cushion 200 is mounted on an upper portion of the seatback 10, and is deployed forward to be located on both sides of the occupant 1 so as to limit upward movement of the occupant 1 by restraining an upper body of the occupant 1 in the event of a vehicle collision.

Specifically, the seatback 10 includes the seatback frame 11 provided vertically and a seatback cover 13 constituting an outer cover by covering the seatback frame 11 as in the embodiment illustrated in FIG. 1 to FIG. 4.

The airbag cushion 200 may be mounted on an upper portion of the seatback frame 11, and may be provided inside the seatback cover 13. Furthermore, at least a part of the airbag cushion 200 may be deployed to the outside of the seatback cover 13 to be located on both sides of the head of the occupant 1. Accordingly, the airbag cushion 200 may limit the upward movement of the occupant 1 by restraining the upper body of the occupant 1.

For example, the airbag cushion 200 may be deployed forward at a height between an upper portion of the seatback 10 and a lower portion of a headrest 20 during deployment, and may be located on the shoulders of both sides of the head of the occupant 1. Accordingly, the airbag cushion 200 may protect the upper body including the neck of the occupant 1.

The airbag cushion 200 may have a cross-section formed in a C shape to surround the neck of the occupant 1. Accordingly, the airbag cushion 200 may be arranged on both shoulders of the occupant 1 without pressing the neck or head of the occupant 1 forward during deployment.

The inflator 300 supplies gas to the airbag cushion 200 in the event of the vehicle collision. The airbag cushion 200 may be inflated by receiving the gas from the inflator 300 and may be deployed forward.

The external tether 400 has one end fixed to the airbag cushion 200 and the other end fixed to the seatback 10.

The external tether 400 may provide a pulling force so that the airbag cushion 200 is pulled downward when the airbag cushion 200 is deployed, thereby restraining the upward movement of the occupant 1 in the event of the vehicle collision.

Specifically, the external tether 400 may be installed outside the airbag cushion 200, and both ends thereof may be fixed to the airbag cushion 200 and the seatback frame 11. Therefore, in a state in which the airbag cushion 200 is deployed forward in the event of the vehicle collision, the airbag cushion 200 may be supported by the external tether 400 to press the upper body of the occupant 1 downward. Accordingly, the upward movement of the occupant 1 is limited in the event of a rear collision, thereby protecting the occupant 1.

In a state in which the seat is rotated, when a front collision occurs in a vehicle traveling direction, a rear collision may occur in the occupant 1. In such a case, the rear collision may be a mid-speed or high-speed rear collision. According to the headrest 20 or airbag system in the related art, there is a limit to limiting the behavior of the occupant 1 in the event of such a mid-speed or high-speed rear collision.

The present disclosure includes the airbag cushion 200 that is mounted on the upper portion of the seatback 10 and restrains the upper body of the occupant 1 during deployment and the external tether 400 that supports the airbag cushion 200, which makes it possible to stably protect the occupant 1 by limiting the upward movement of the occupant 1 even in the event of a mid-speed or high-speed rear collision.

The airbag cushion 200 may include side cushion parts 210 and a connection cushion part 230.

The side cushion parts 210 may be provided to be deployed forward from the upper portion of the seatback 10 and located on both sides of the occupant 1. Furthermore, the side cushion parts 210 may be provided to press the shoulder of the occupant 1 downward by the external tether 400, and may be provided as a pair.

The connection cushion part 230 may connect the pair of side cushion parts 210. The connection cushion part 230 may be fixed to a mounting part 12 formed on the rear surface of the upper portion of the seatback frame 11 provided in the seatback 10.

Specifically, the side cushion parts 210 and the connection cushion part 230 may be provided to communicate with each other. For example, during deployment, the side cushion parts 210 may be located in front of the headrest 20 and the connection cushion part 230 may be located at the rear of the headrest 20. The side cushion parts 210 may be deployed to both sides of the head of the occupant 1 and restrain the shoulder of the occupant 1.

The connection cushion part 230 may allow the pair of side cushion parts 210 to communicate with each other, and supply the side cushion parts 210 with the gas supplied from the inflator 300. Therefore, the side cushion parts 210 may be inflated. The connection cushion part 230 may include fixing holes 233 for being fixed to the mounting part 12 of the seatback frame 11.

Referring to FIG. 4, the external tether 400 may be provided outside the airbag cushion 200, and the pair of external tethers 400 may correspond to the pair of side cushion parts 210.

For example, one end of the external tether 400 may be fixed to the front portion of the side cushion part 210, and the other end of the external tether 400 may be fixed to a position spaced apart from the upper portion of the seatback 10 in the downward direction. For reference, FIG. 4 illustrates a process in which the airbag cushion 200 is installed in the seatback 10, and illustrates a state in which the connection cushion part 230 is fixed to the mounting part 12 and the airbag cushion 200 is mounted on the seatback frame 11.

Specifically, the side cushion parts 210 may each be provided with a tether fastener 211 at an outer portion of the front side. One end of the external tether 400 may be fixed to the tether fastener 211. For example, the tether fastener 211 may be located at the front portion of the side cushion part 210 (see FIG. 5 and FIG. 6). Therefore, one end of the external tether 400 is fixed to the end of the side cushion part 210, so that the support force of the external tether 400 with respect to the side cushion part 210 may increase.

The other end of the external tether 400 may be fixed to the seatback frame 11 and may be fixed at a position spaced apart from the upper portion of the seatback frame 11 in the downward direction. Therefore, in a state in which the airbag cushion 200 is deployed, the external tether 400 is provided to be inclined downward toward the seatback 10, thereby supporting the side cushion part 210 while pulling the side cushion part 210 downward.

With the configuration of the external tethers 400, the side cushion parts 210 restrain the shoulders of the occupant 1 in the state in which the airbag cushion 200 is deployed, thereby stably limiting the upward movement of the occupant 1.

However, the connection positions of the external tethers 400 are not limited to the above, and may be modified as long as the external tethers 400 may support the side cushion parts 210 downward.

Figure 7:
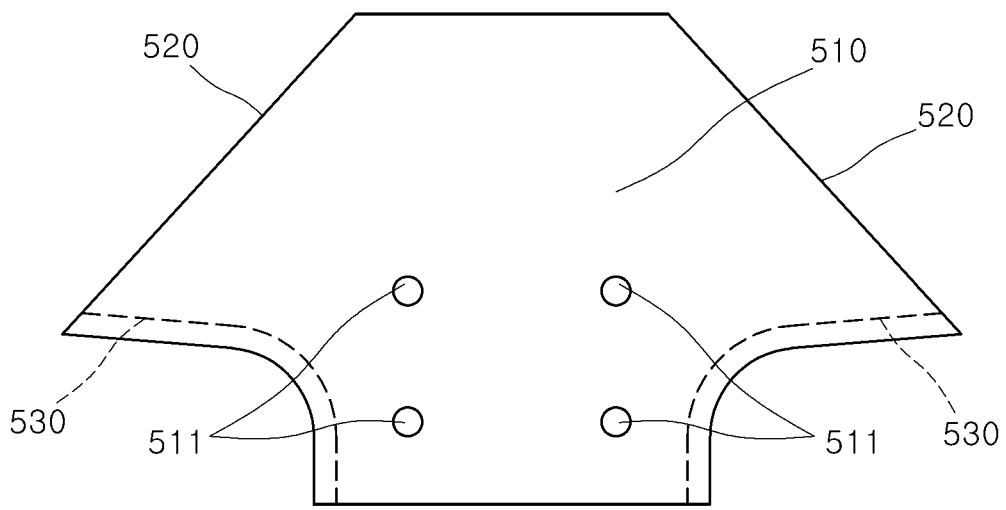
FIG. 7 is a deployment view illustrating a diffuser applied to an embodiment of the present disclosure.

Referring to FIG. 5 to FIG. 7, the inflator 300 may be inserted and assembled into the connection cushion part 230. Then, the gas supplied from the inflator 300 to the connection cushion part 230 may be distributedly supplied to the pair of side cushion parts 210. The connection cushion part 230 may be formed with an opening 231, into which the inflator 300 is inserted, during assembly.

The gas supplied from the inflator 300 may be first supplied to the connection cushion part 230 of the airbag cushion 200 and then supplied from the connection cushion part 230 to the pair of side cushion parts 210. Therefore, the airbag cushion 200 may be deployed outside the seatback cover 13 while being inflated.

An embodiment of the present disclosure may further include a diffuser 500. The diffuser 500 may be assembled with the inflator 300, may be inserted into the connection cushion part 230, and may be provided to distribute the gas supplied from the inflator 300 to the pair of side cushion parts 210.

Referring to FIG. 7, the diffuser 500 may include a gas ejection region 520 and a sewing line 530.

The gas ejection regions 520 may be provided to correspond to the pair of side cushion parts 210, may be provided to eject the gas supplied from the inflator 300 to the inner spaces of the side cushion parts 210, and may be provided as a pair.

The sewing line 530 may be formed in a partial region of an edge of the diffuser 500 so that the gas ejection regions 520 is formed.

For example, the airbag cushion 200 may be formed in a C shape including the side cushion parts 210 and the connection cushion part 230, and the diffuser 500 may be assembled with the connection cushion part 230 to uniformly distribute the gas to the pair of side cushion parts 210.

The diffuser 500 may be formed by sewing a diffuser body 510 made of a fabric material. The sewing line 530 may be a region in which a partial region of an edge of the diffuser body 510 is sewn, and the gas ejection region 520 may be a region, where the sewing line 530 is not formed, as a region of the diffuser body 510.

The diffuser body 510 may include an inclined portion whose width is narrowed toward the side cushion parts 210 in the deployed state, and the gas ejection regions 520 may be arranged in such an inclined portion. Furthermore, the respective gas ejection regions 520 may be provided to correspond to the respective side cushion parts 210.

The gas supplied from the inflator 300 may be supplied into the diffuser 500, and the diffuser 500 may distributedly eject the supplied gas to the side cushion parts 210 through the gas ejection regions 520. Therefore, the gas supplied from the inflator 300 may be quickly and uniformly ejected to the side cushion parts 210, thereby increasing the inflation and deployment speed of the airbag cushion 200.

The diffuser body 510 may be formed with assembly holes 511 for being assembled with the inflator 300. For example, fixing bolts 310 may protrude from the inflator 300 and may penetrate through the assembly holes 511 of the diffuser 500. The inflator 300 may be assembled with the diffuser 500 and then inserted into the airbag cushion 200. At this time, the fixing bolts 310 of the inflator 300 may penetrate through the fixing holes 233 of the connection cushion part 230 while penetrating through the assembly holes 511, and may be fixed to the mounting part 12 of the seatback frame 11 by bolting and the like.

However, the material and the configuration for coupling of the diffuser 500 are not limited to the above.

Hereinafter, a process of assembling and operating the airbag system 100 for a vehicle in accordance with an embodiment of the present disclosure will be described.

First, the inflator 300 is assembled with the diffuser 500, and then is inserted and assembled into the airbag cushion 200. The fixing bolts 310 of the inflator 300 may penetrate through the fixing holes 233 of the connection cushion part 230, and then may be fastened to the mounting part 12 of the seatback frame 11. Therefore, the connection cushion part 230 may be fixed to the mounting part 12.

The airbag system 100 for a vehicle may be located at the upper portion of the seatback 10 in the state in which the connection cushion part 230 is fixed to the rear surface of the upper portion of the seatback frame 11.

When a vehicle collision and the like occur, the airbag cushion 200 may receive gas from the inflator 300 and may be deployed forward while being inflated. At this time, the gas may be quickly distributed to the side cushion parts 210 by the diffuser 500.

The side cushion parts 210 may be located on both sides of the head of the occupant 1 while being deployed, and may be supported downward by the external tethers 400 to press both shoulders of the occupant 1 downward. Therefore, the upper body of the occupant 1 is restrained and upward movement of the occupant 1 is limited, thereby minimizing the injury to the occupant 1.

As described above, the present disclosure includes the airbag cushion that is mounted on the upper portion of the seatback and restrains the upper body of an occupant during deployment and the external tether that supports the airbag cushion, which makes it possible to stably protect the occupant by limiting the upward movement of the occupant even in the event of a mid-speed or high-speed rear collision.

So far, although specific embodiments of the present disclosure have been described above, the spirit and scope of the present disclosure are not limited by such specific embodiments, and various corrections and modifications can be made by those skilled in the art in the technical field, to which the present disclosure pertains, without changing the subject matter of the present disclosure defined in the appended claims.

What is claimed is:

1. An airbag system, comprising:
   an airbag cushion attached to an upper portion of a seatback and configured to deploy toward both sides of a vehicle occupant's neck without covering the vehicle occupant's head or front body and restrain an upper body of the vehicle occupant from moving upward in an event of a vehicle collision;
   an inflator configured to supply a gas to the airbag cushion in the event of the vehicle collision; and
   an external tether having one end connected to the airbag cushion and the other end connected to the seatback.

2. The airbag system of claim 1, wherein the external tether is configured to pull down the airbag cushion when the airbag cushion is deployed.

3. The airbag system of claim 1, wherein the airbag cushion comprises a pair of side cushion parts configured to deploy forward from the upper portion of the seatback and be held on both sides of the vehicle occupant's neck by the external tether to press shoulders of the vehicle occupant downward; and
   a connection cushion part extending between the pair of side cushion parts.

4. The airbag system of claim 3, wherein the connection cushion part is attached to the upper portion of the seatback.

5. The airbag system of claim 3, wherein the external tether comprises a pair of external tethers provided corresponding to the pair of side cushion parts, respectively.

6. The airbag system of claim 3, wherein the external tether has one end connected to a front portion of the side cushion part and the other end connected to a portion of the seatback lower than the upper portion of the seatback.

7. The airbag system of claim 3, wherein the inflator is attached to the connection cushion part, and the gas supplied from the inflator is distributed to the pair of side cushion parts.

8. The airbag system of claim 3, further comprising a diffuser connected to the inflator and the connection cushion part and configured to distribute the gas supplied from the inflator to the pair of side cushion parts.

9. The airbag system of claim 8, wherein the diffuser comprises:
   a pair of gas ejection regions provided corresponding to the pair of side cushion parts, respectively, and configured to eject the gas supplied from the inflator to inner spaces of the side cushion parts; and
   a sewing line partially extending along an edge of the diffuser to form the pair of gas ejection regions.

10. The airbag system of claim 1, wherein the airbag cushion is configured, when deployed, to have a shape that surrounds the vehicle occupant's neck.

\* \* \* \* \*